Feb. 28, 1950     J. E. METZKIER     2,499,106

MULTIRING STANDARD TAPER GROUND GLASS JOINT

Filed July 29, 1947

JOSEPH E. METZKIER, Inventor

By McMorrow, Berman & Davidson
Attorneys

Patented Feb. 28, 1950

2,499,106

UNITED STATES PATENT OFFICE 2,499,106

MULTIRING STANDARD TAPER GROUND GLASS JOINT

Joseph E. Metzkier, Cliffside Park, N. J.

Application July 29, 1947, Serial No. 764,320

1 Claim. (Cl. 285—161)

This invention relates to improvements in standard taper ground glass joints.

An object of the invention is to provide an improved form of standard taper ground glass joint, particularly the female member thereof, the latter being so constructed as to readily permit present type clamps to apply pressure evenly over the entire area where the clamp is attached.

Another object of the invention is to provide an improved form of standard ground glass joint the female member of which is provided with a plurality of integral glass rings of uniform outside diameter and so arranged as to strengthen the female member and hence the entire joint, to correspondingly reduce the danger of breakage.

A further object of the invention is to provide a female member forming a part of a standard ground glass joint; the female member having a tapering inner ground glass bore to receive the correspondingly ground male member to form a tight seal, and having a plurality of spaced peripheral outer rings formed in said female member, with consequent increased heat dissipation from the female member in such manner as to tend to cool the joint, keeping it at a normal temperature, and also lessening the tendency of sticking or freezing of the joint members.

Still another object of the invention is to provide a standard ground glass joint having the enumerated improved characteristics, the components of which are simple in design, inexpensive to manufacture, and efficient for the purpose intended.

Other objects and advantages of the invention will become apparent from the following description of a preferred embodiment thereof as illustrated in the accompanying drawings, and in which.

Figure 3:
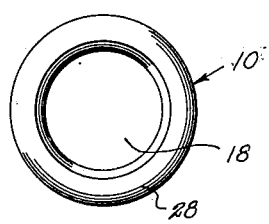
Figure 3 is a top plan view of the member shown in Figure 1.
Figure 4:
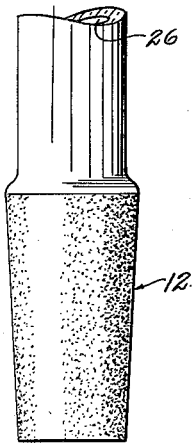
Figure 4 is a fragmentary elevational view of the male member of a standard ground glass joint.

Most chemical apparatus incorporating standard taper ground glass joints include in their assembly clamps, which apply an external pressure to the joint. It has been found that pressure from the clamp frequently results in breakage of the members forming the joint even though extreme care is taken in applying the clamp and in adjusting its pressure about the female member of the joint.

Sealing compound is also commonly employed to seal these joints, and it frequently happens that the temperature rise in the joint—for various reasons well known to those skilled in the art, such as the passage of hot fluids therethrough—will cause the sealing compound to liquefy, thus destroying its sealing effect. In addition, failure to maintain uniform temperatures of the male and female members of the joint, will result in a tendency of sticking or freezing of the joint members.

The present invention provides means for avoiding these disadvantages. In order to understand clearly the nature of the invention, and the best means for carrying it out, reference may now be had to the drawings, in which like numerals denote similar parts throughout the several views.

As shown, there is a female joint member generally indicated at 10, and a male member generally indicated at 12, these two parts being usually formed of glass and being assembled together to form the joint. The female member 10 includes a main tube 14 the lower end portion 16 of which may be connected to a piece of chemical glass apparatus, or to a length of glass tubing in a manner well known in the art; the tube 14 having an axial bore 18 formed therein to conduct fluids or gases as the case may be. Integral with the main tube 14 is the female body member 20 which has a downwardly convergent inner bore 22 in communication with the bore 18, and has its inner surface ground as shown in Figure 2, to provide a seat or socket adapted to receive the hollow tubular male portion or plug 12.

The plug 12 is similarly ground on its outer downwardly convergent surface so as to fit snugly into the socket in the female member and to form a relatively tight seal therewith. When these two parts are thus mutually engaged, it is apparent that the axial bore 26 of the male member 12 will be in communication with the bores 22 and 18 of the female member to conduct fluids therethrough.

Figure 1:
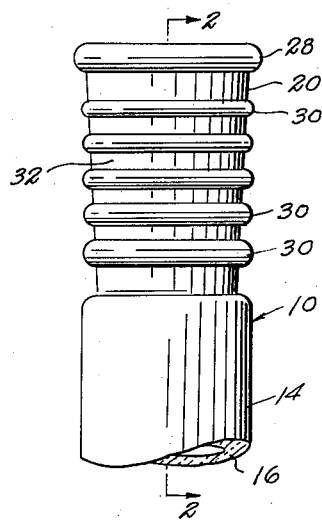
Figure 1 is a fragmentary elevational view of the female member of a standard ground glass joint.
Figure 2:
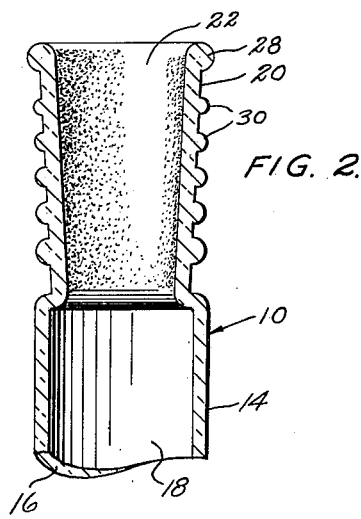
Figure 2 is a sectional elevation taken on line 2—2 of Figure 1.

A bead 28 may be formed adjacent the mouth of the socket of the female member 10 for strength and the socket mouth itself may be rounded as shown best in Figure 2, to avoid chipping upon engagement of the parts. A number of mutually spaced reinforcing rings 30 are formed integrally with the female socket portion 20, as shown best in Figures 1 and 2, the rings being preferably of the same material as the rest of the joint.

It will be observed from Figures 1 and 2, that without the reinforcing rings 30, the outer surface 32 is tapered. Therefore, a clamp applied thereto would have substantially a single line of contact with such surface. As a consequence of this engagement the clamp would ordinarily not extend at right angles to the bore of the joint. Its single line of engagement would induce breakage especially under the flow of liquid of high and low temperatures. However, it will also be observed that the radial extent of the reinforcing rings 30 beyond the underlying outer wall surface 32 increases from top to bottom, the reinforcing rings all having the same outside diameter and thus providing a substantially cylindrical multi-ringed bearing surface for the clamp. The clamp, which is usually adapted to grip with greatest effect a cylindrical surface, has the same highly effective gripping force upon the peripheries of the reinforcing rings 30 which may also be conveniently termed circular ribs. Therefore, the clamps will ordinarily extend perpendicular to the axis of the joint.

This type of construction provides the following distinct advantages over the present types. Firstly, the reinforcing rings being closely distributed over the entire surface of the ground area, provide greater mechanical strength, especially in the critical part of the joint, that is, just above the bulb.

Secondly, the rings 30, being of uniform outside diameter, provide a cylindrical form which is uniformly gripped by a clamp. Thirdly, the vane-like rings act to increase the radiation of heat from the joint, tending to keep it at a normal temperature. This also aids in preventing freezing or sticking of the joint members. The rings also absorb the shock of accidental blows, thus preventing damage to the vital areas of the joint.

Although I have described a preferred embodiment of my invention in specific terms, it is to be understood that various changes may be made in size, shape, materials and arrangement without departing from the spirit and scope of the invention as claimed.

I claim:

In combination a pair of glass tube sections, a coupling therefor comprising an outwardly tapered plug at the end of one section, an outwardly flared socket at the end of the second section to receive said plug portion and engage the surface thereof to form a fluid-tight joint in cooperation therewith, a plurality of rings extending outwardly from the exterior surface of said second section and spaced over the area of the socket, said ribs being of graduated and diminishing height in the direction of the open socket end and providing at their apices a clamp-mounting surface which in aggregate is of substantially constant diameter.

JOSEPH E. METZKIER.

REFERENCES CITED

The following references are of record in the file of this patent:

UNITED STATES PATENTS

| Number | Name | Date |
|---|---|---|
| 1,755,971 | Smalley | Apr. 22, 1930 |
| 2,012,487 | Swanson | Aug. 27, 1935 |
| 2,066,889 | Kay | Jan. 5, 1937 |
| 2,083,228 | Geyer | June 8, 1937 |
| 2,154,574 | Martin | Apr. 18, 1939 |